United States Patent [19]
Schuldt, Jr.

[11] 3,822,047
[45] July 2, 1974

[54] TAKEOFF AND GO-AROUND CLIMB-OUT PROFILE PITCH COMMAND FORMULATION FOR AIRCRAFT

[75] Inventor: Theodore J. Schuldt, Jr., Thousand Oaks, Calif.

[73] Assignee: Collins Radio Company, Dallas, Tex.

[22] Filed: Dec. 14, 1972

[21] Appl. No.: 315,272

[52] U.S. Cl............................ 244/77 D, 235/150.22
[51] Int. Cl............................................. B64c 13/18
[58] Field of Search............ 73/178 T; 235/150.22; 244/77 A, 77 D; 318/583–584; 343/565, 108 R

[56] References Cited
UNITED STATES PATENTS

| | | | |
|---|---|---|---|
| 3,327,973 | 6/1967 | Kramer et al..................... | 244/77 A |
| 3,510,092 | 5/1970 | Hendrick et al.................. | 244/77 D |
| 3,681,580 | 8/1972 | Gwathmey et al............ | 244/77 D X |
| 3,691,356 | 9/1972 | Miller........................... | 244/77 D X |

*Primary Examiner*—Trygve M. Blix
*Assistant Examiner*—Stephen G. Kunin

[57] ABSTRACT

A pitch command signal formulation using angle-of-attack as basic reference provides improved noise abatement takeoff and go-around aircraft climb profiles. A stall margin reference angle-of-attack, as modified by flap position provides an angle of attack rundown profile based on flap change schedules. Rundown is effected in response to first flap reductions during the climbing phase in either mode such that common signal formulation circuitry is employed to command the same profile for either flight mode.

9 Claims, 5 Drawing Figures

$$\gamma \approx \sin \gamma = \frac{\dot{h}}{V}$$

TAKEOFF AND GO-AROUND CLIMB-OUT PROFILE PITCH COMMAND FORMULATION FOR AIRCRAFT

This invention relates generally to the formulation of command signals for automatic or manual control of aircraft and more particularly to the formulation of pitch command signals for application to an autopilot, or for command response by a pilot, by means of which a predetermined climbout and go-around profile may be attained.

This invention relates to the formulation of pitch command signals in a system wherein the basic pitch command is angle-of-attack error and the reference angle of attack is varied to be consistent with operational speeds, flap retraction schedules, and with aircraft performance.

Control signal formulation for takeoff and go-around flight modes are known wherein the system maintains or attains a predetermined profile by utilizing vertical speed (rate of change of altitude) as the basic reference. Systems of this type do not permit a change in speed with constant altitude since they provide for no change in angle-of-attack command and thus do not permit attainment of takeoff or go-around profiles having the versatility of permitting changes in speed with essentially constant altitude.

Accordingly, the primary object of the present invention is provision of a pitch command control system for takeoff and climb profiles responsive to flap change schedules (to a lesser flap deployment) to start a timed rundown of angle-of-attack command at a predetermined rate to a predetermined terminal reference.

This invention is featured in the provision of pitch command signal formulation where angle-of-attack is the basic pitch command, and where the reference angle-of-attack is varied so as to always maintain a predetermined airspeed margin over stall speed by allowing a predetermined increase in speed with flaps at initial settings followed by a further decrease in angle-of-attack to permit speed buildup sufficient for a flap retraction. Upon the first change in flaps occurring during the climbing phase in either takeoff or go-around modes, the angle-of-attack reference is linearly decreased from the reference existing at that time at a predetermined rate, allowing airspeed to increase proportionally and consequently allowing flaps to be fully retracted.

The invention is further featured in a pitch command signal formulation using basic angle-of-attack error reference (difference between experienced angle-of-attack and a reference angle-of-attack varied to be consistent with operational speeds and flap retraction schedules as well as aircraft performance) in a control profile permitting improved noise abatement takeoff and go-around profiles.

These and other features and objects of the present invention will become apparent upon reading the following description with reference to the accompanying drawings in which.

Figure 1:
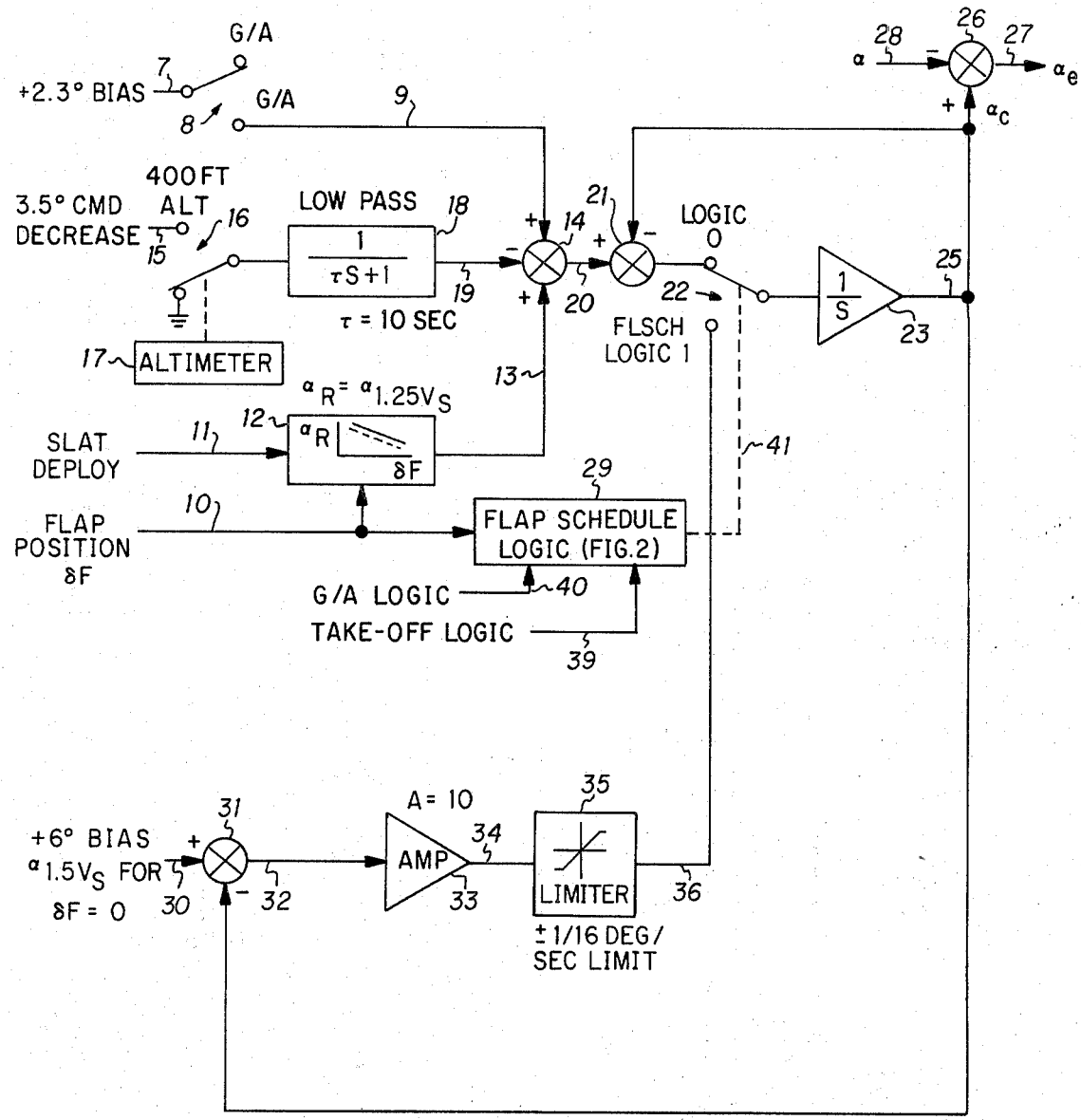
FIG. 1 is a functional block diagram of an angle-of-attack command signal formulation by means of which the takeoff and go-around profiles are obtained in accordance with the present invention.

Flight control systems generating pitch command signals based on a basic angle-of-attack reference have long been recognized in the art as providing the advantage of maintaining the aircraft in a flight configuration with a prescribed safety margin above stall speed and in having the advantage of providing pitch commands which are independent of airspeed. In systems employing altitude rate and airspeed, a number of variable input parameters must be considered and, as described above, those systems particularly employing altitude rate h as a primary reference do not permit changes in airspeed with constant altitude. Thus state-of-the-art pitch computer computations in autopilots have, in the interest of safety and flexibility, employed angle-of-attack as a primary reference.

Typical systems employing angle of attack as a reference have attained noise abatement profiles in commanding an aircraft climb at an engine-out climb speed of V2 or V2 + 10 up to a predetermined noise abatement altitude (for example 1500 feet) and holding that speed with the initial flap setting. No change in the aircraft configuration is made under the exampled 1500 feet altitude, and then the profile may call for retarding throttles to level off. Thus a quick climb is attained, followed by a throttle retard until the noise sensitive area is passed, whereupon power is applied and acceleration is continued.

The takeoff and go-around profile provided by the present invention permits a compromise permitting a climb indefinitely beyond a predetermined altitude (for example, 400 or 800 feet) while attaining a small amount of speed buildup but not an indefinite speed buildup. The profile of the present invention allows maintenance of the initial flap setting up to the predetermined altitutde with the continuance of the same speed with reduced power to fly a noise abatement profile, followed at the end of the noise abatement profile by a permissible flap decrease since sufficient speed permissible for such a change will have been attained. When a decrease in flap angle is sensed, a timed rundown is initiated with a substantially linear decrease in angle-of-attack, permitting a gradual speed buildup sufficient to attain a speed permitting acceleration and flap reduction to zero (a clean wing condition).

The present invention, as will be further described, provides for the development of a pitch command signal as might be applied to a flight director indicator which will indicate to the pilot what he would do manually. In following the pitch command, the pilot, in initiating an airspeed scheduled flap retraction, triggers the automatic rundown of the angle-of-attack command for speed buildup. The command presented to the pilot is a command that can be followed continuously and which will not permit an indefinite speed buildup until the first flap change is initiated. Sufficient speed buildup to make that first flap change is commanded but the command signal does not command a continuous nose-over to build up more and more speed until the first flap change is actually made, and then flap reduction with subsequent nose-over is commanded at a rate which can be easily managed by the pilot.

The pitch signal command formulation to be described utilizes identical signal calculations in each of the takeoff and go-around flight modes, with the exception that the timed rundown of angle-of-attack reference at a predetermined rate commences in the takeoff mode when the first change in flaps is made from the takeoff flap position, while in the go-around mode the timed rundown is initiated when the flaps are reduced to a predetermined angle, for example 22°.

The angle-of-attack reference profile commanded in each of the takeoff and go-around modes provides an initial angle-of-attack reference based on a predetermined safety margin above stall speed (for example 1.25 $V_s$) followed by an initial nominal decrease (for example 3.5°) over a period of time to allow initial speed buildup sufficient to permit a change in flaps.

The timed rundown of angle-of-attack reference is initiated by a flap schedule logic circuitry which in takeoff mode responds to the first change in flaps from the initial takeoff reference, and, in the go-around mode, responds to the flaps being reduced to a predetermined angle.

The flap schedule logic uniquely accomplishes equivalent control in takeoff and go-around modes under slightly different operational circumstances. For example, in takeoff mode there are several flap settings for a given aircraft which are usable for takeoff and provision is made to memorize the particular flap setting for a particular takeoff and from that memorized value detect the first flap reduction to effect the timed rundown of angle-of-attack command. In effecting a go-around maneuver from a landing flap configuration, the sequence of pilot responses begins with an increase in power and an immediate raising of flaps from the landing flap configuration. The flap schedule logic employed in the present invention uniquely does not respond to that particular initial flap change but rather treats that immediate flap change upon go-around initiation as being equivalent to the takeoff setting detected at lift-off during takeoff mode. Therefore during go-around mode the flap schedule logic effects the timed rundown in response to what is, in effect, the second change as far as the go-around maneuver is concerned, but, in terms of actual aircraft climb, the governing flap change is really the first flap change.

Thus in general operation the present invention provides an angle-of-attack command signal formulation providing a climb profile for both takeoff and go-around modes which is based on a nominal angle-of-attack at the initiation of the mode and in response to change in flaps (to a less flap position) initiates a timed rundown of command and angle-of-attack at a predetermined, essentially linear, rate. In takeoff mode this timed rundown is effected from the first change in flaps from that flap position memorized for a particular takeoff. In go-around mode the timed rundown is effected at the same rate but initiated when the flaps are retracted to be less than a predetermined number of degrees. The predetermined number of degrees is selected to be less than that deployment to which the flaps are normally initially retracted from landing flap position when go-around mode is initiated.

In either the takeoff or go-around modes, an initial reduction in angle-of-attack reference to permit a nominal speed-up permissible for a first flap change is initiated at a predetermined altitude. Thus the angle-of-attack reference profile provided by the present invention commands an essnetially identical profile for each of takeoff and go-around modes with the difference that the timed rundown of angle-of-attack is effected by flap change logic circuitry in a particularly different manner for the two modes but in either case is effected during what is detected as the first flap change during a climbing portion of the aircraft performance.

Figure 5:
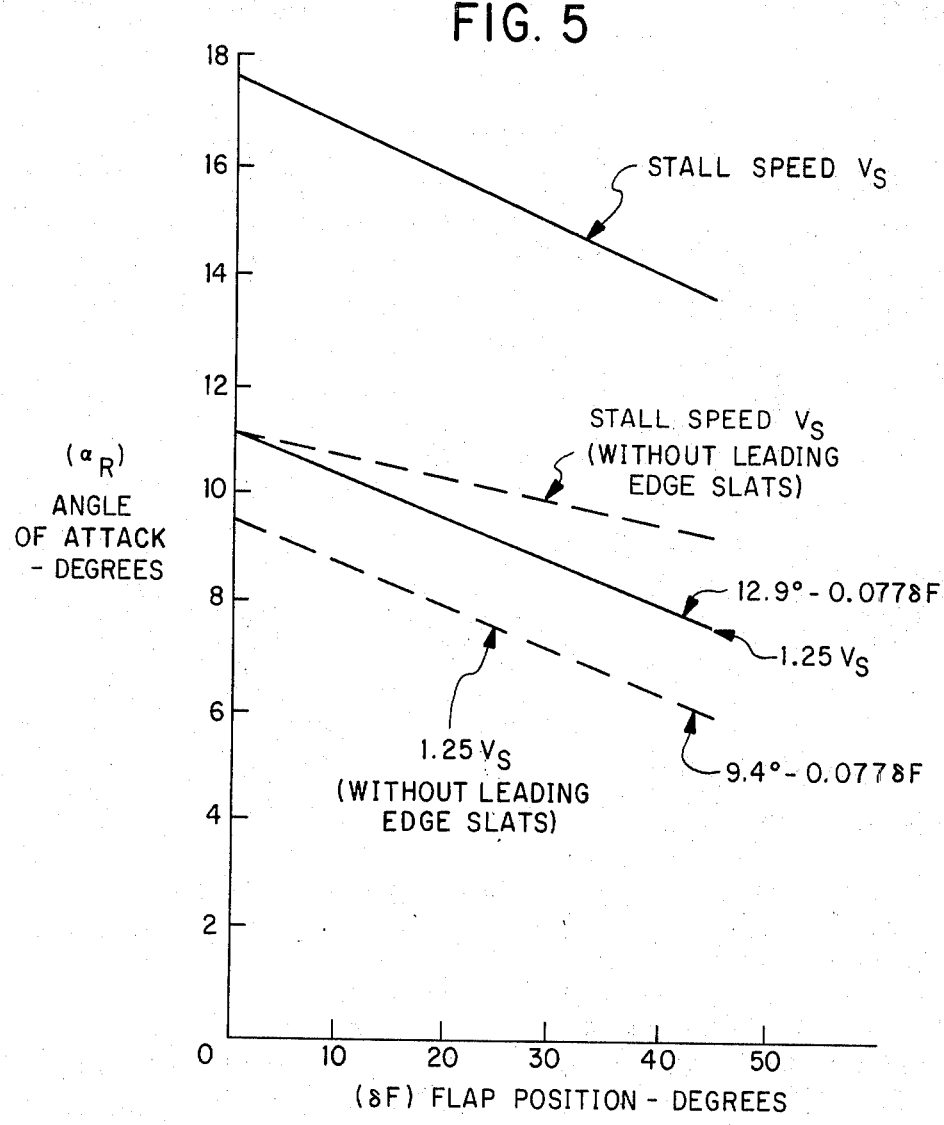
FIG. 5 is a representative plot of angle-of-attack references as a function of flap positions for maintenance of predetermined margins of safety over stall airspeed ($V_s$) for a particular wing configuration.

As above described, the angle-of-attack basic command reference of the present invention assures a safety margin above stall speed. Thus the basic angle-of-attack command is attained from a predetermined angle-of-attack reference profile circuitry which, in response to a flap position signal input, provides a reference angle-of-attack output corresponding to some particular safety margin over stall speed for the particular aircraft wing configuration. Reference is made to FIG. 5 wherein typical angle-of-attack references for various flap position deployments for a particular aircraft are depicted. The relationship is seen to be a family of straight line relationships each of which is predetermined for a particular aircraft depending upon the flap position and, for example, whether or not the leading edge wing slats are deployed. FIG. 5 depicts the stall warning of attack relationship between angle-of-attack and flap position with and without leading edge slat deployment together with the 1.25 $V_s$ relationship with and without leading edge slat deployment. For example, for a particular aircraft with leading edge wing slats deployed, the relationship as depicted in FIG. 5 may be written:

$$\alpha 1.25\ V_s(\delta_F) = 12.9° - .077\delta_F,$$

and without leading edge slats deployed may be expressed as:

$$\alpha 1.25\ V_s(\delta_F) = 9.4° - .077\delta_F.$$

With reference to FIG. 1, a signal input 10 proportional to the existing flap position $\delta_F$ is applied to a reference angle-of-attack profile generating circuitry 12 together with an input 11 indicative of leading edge slat deployment. The profile circuitry 12 might comprise an analog signal shaping circuitry the function of which is to generate, in response to each particular flap position and slat deployment input 10 and 11, an angle-of-attack reference signal output, $\alpha_R$, corresponding to an airspeed of 1.25 $V_s$, where $V_s$ is the stall speed for the particular flap and slat deployment being experienced. These relationshilps are mathematically definable for a given airframe. Thus the output 13 from the profile generating circuitry 12 corresponds to a particular point on a line function relationship as exampled in FIG. 5. Angle-of-attack reference outputs 13 from circuitry 12 are thus similar to stall margin throttle commands in angle-of-attack throttle command systems.

Thus the output 13 from the profile generating circuitry 12 corresponds at all times to an angle-of-attack reference $\alpha_R$ corresponding to an airspeed of 1.25 $V_s$, and this reference angle of attack is varied in accordance with flap position and slat deployment to be consistent with operational speeds and aircraft performance.

The reference angle-of-attack signal 13 is then modified in accordance with the particular flight profile of the present invention to become an angle-of-attack command ($\alpha_c$) which may be compared with the measured or experienced angle-of-attack to provide an angle-of-attack error ($\alpha_e$) output. The autopilot, or a pilot responding to conventional command instrumentation, reduces the angle-of-attack error $\alpha_e$ to zero and causes the aircraft to follow the predetermined flight profile.

Figure 3:
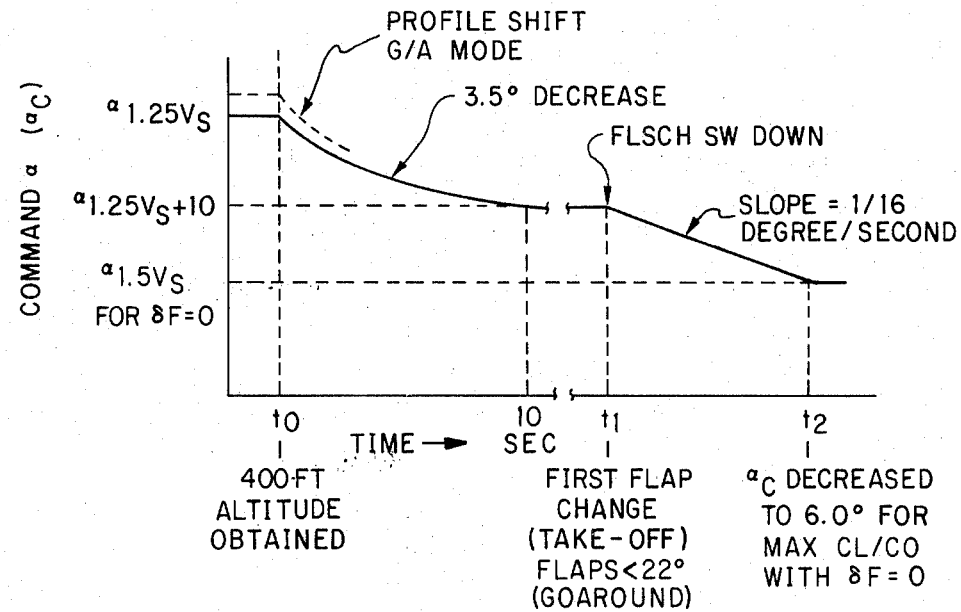
FIG. 3 illustrates the type of angle-of-attack reference profile obtainable with a control system with the command signal formulation of FIG. 1.
Figure 4:
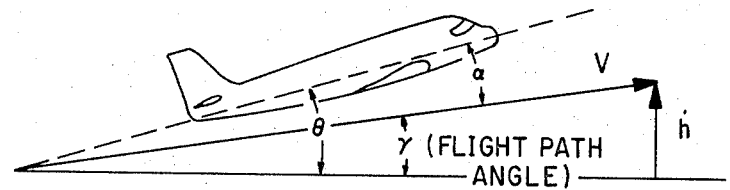
FIG. 4 is a diagrammatic representation of aircraft command of attack, flight path angle, and pitch angle as referenced to the airspeed altitude rate vectors.

In accordance with the present invention, an exampled profile which may be commanded is depicted graphically in FIG. 3 wherein the commanded angle-of-attack $\alpha_c$ is shown as a function of time. The initial angle of attack, corresponding to 1.25 $V_s$ corresponds to a $V_2$ reference to provide engine-out climb capability up to a predetermined altitude. The $V_2$ reference angle of attack is decreased upon the predetermined altitude being attained at $t_o$ by an exampled 3.5° over a ten-second time period to $^{\alpha}V_s + 10$ to allow, for example, a ten-knot speed buildup to 1.25 $V_s + 10$ knots and permit a first flap change. At time $t_1$, corresponding to the first flap change from the takeoff reference in takeoff mode, or a flap reduction to less than 22° during go-around mode, the angle of attack reference $\alpha_R$ decreased from the $t_1$ value at a gradual rate (for example 1/16° per second) in an essentially linear fashion to an angle-of-attack corresponding to 1.5 $V_s$ with zero flap deployment, allowing airspeed to increase and consequently allowing flaps to be fully retracted. This nominal (1/16° per second) rate is small enough to avoid stability problems and to prevent negative flight path angles for the lowest expected excess thrust with one engine out.

The profile depicted in FIG. 3 is commanded for either takeoff or go-around mode operation by operating on the angle-of-attack reference 13, with certain altitude trip-point initiated bias signal introductions, and flap schedule logic initiated synchronizing and fading operations.

As depicted in FIG. 1, the angle-of-attack reference signal 13 from the profile generating circuitry 12 is applied as a first input to a signal combining means 14. A bias signal source 15, corresponding to a 3.5° angle-of-attack decrease, is applied as a second (subtractive) input 19 to signal combining means 14. Bias 15 is applied through an altitude responsive switch 16 and a low pass filter 18. The 3.5° command decrease is thus faded into the signal comparison means 14 during a time determined by the time constant of the low pass filter 18 (exampled as 10 seconds) when a predetermined altitude of, for example, 400 feet, is sensed by an onboard altimeter 17.

This initial command decrease permits a speed buildup to, for example, 1.25 $V_s + 10$ knots, thus allowing sufficient speed to permit a first flap retraction by the pilot at time $t_1$. The output 20 from signal combining means 14 is applied to a signal synchronizer fader circuitry, the operational modes of which are determined by a flap schedule logic switch in the synchronizer loop. The output 20 from signal combining means 14 is applied as a first input to a further combining means 21. With the flap schedule (FLSCH) logic switch 22 in the illustrated logic 0 position, the output from combining means 21 is applied to a signal integrator 23. The output 25 of the integrator is applied back as a subtractive second input to signal combining means 21 such that the synchronizer output 25 designated $\alpha_c$, synchronizes to the angle-of-attack reference input as provided by the output 20 of signal combining means 14. Thus at time $t_1$ (FIG. 3) the output 25 from the synchronizer loop comprises a signal synchronized to the value of the reference angle-of-attack signal existing at that time. The commanded angle-of-attack signal 25 is applied to an output signal combining means 26 for subtractive comparison with an experienced angle-of-attack signal 28 to formulate the angle-of-attack error output signal 27.

The timed rundown of angle-of-attack command $\alpha_c$ at time $t_1$ (FIG. 3) is initiated when the flap schedule logic switch 22 switches to the lower (logic 1) position in FIG. 1. Switch 22 is in the closed loop (synchronizing) position in response to a logic 0 output from flap schedule logic block 29. Details to the flap schedule logic circuitry 29 which develops output logic levels to position switch 22 will be further discussed.

The linear decrease in the commanded angle of attack to which the integrator in the synchronizing loop is synchronized at time $t_1$ (FIG. 3) to a 1.5 $V_s$ value is accomplished under the control of a further bias source 30 which corresponds to the terminal value. FIG. 1 illustrates a 6° bias source 30 applied to a signal combining means 31 where it is subtractively combined with the synchronized commanded angle-of-attack signal 25 which is developed by the integrator in the aforedescribed synchronizer loop. The output 32 from signal combining means 31 is applied to a high gain amplifier 33 and through a limiter 35 through interconnection 36 to the lower (logic 1) terminal of the flap schedule logic switch 22.

Differences 32 between the 6° bias and $\alpha_c$ are amplified by high gain amplifier 33 to become a large signal 34. This causes the output 34 of the high gain amplifier 33 to exceed the setting of limiter 35 for all but very small differences between the 6° bias and $\alpha_c$. Hence, the limiter output 36 will be equal to the limit value and will remain constant at that value until $\alpha_c$ is approximately equal to the 6° bias. When FLSCH logic is a 1, the output 36 of the limiter 35 is the input to the integrator 23.

When the input to an integrator is constant, the integrator output changes with a constant rate of change. The limiter output, then, which is constant during the $\alpha_c$ transition to 6° bias, represents the constant rate of change of the integrator output, e.g., 1/16° per second.

Figure 2:
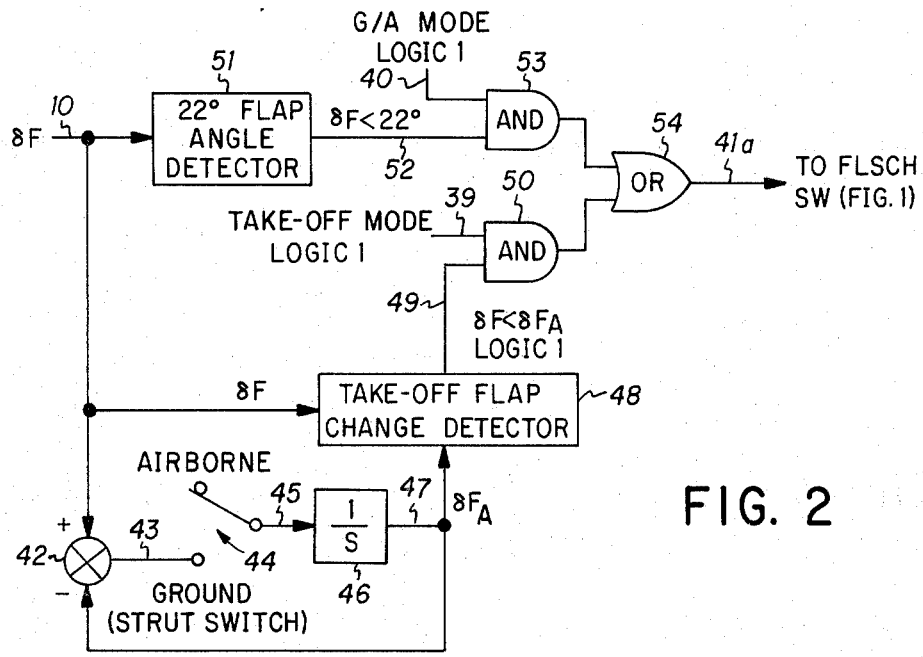
FIG. 2 is a functional diagram of flap schedule logic embodied in the system of FIG. 1.

The manner in which the flight schedule logic switch 22 is switched from logic 0 to logic 1 positions to initiate the timed rundown of command angle of attack may be accomplished by a flap schedule logic circuitry as depicted in FIG. 2. Logic circuitry 29 is depicted in FIG. 1 as being responsive to inputs corresponding to flap position $\delta_F$ along with takeoff mode logic input 39 and go-around mode logic input 40. As depicted in FIG. 2, a particular embodiment of logic to accomplish the aforedescribed functions is illustrated.

Previous discussion indicated that, in go-around mode, the angle-of-attack command rundown at the exampled 1/16° per second was initiated when the flaps were reduced to 22°. The figure of 22 degrees, as exampled herein, is based on nominal go-around procedures which dictate that an immediate flap reduction might nominally be a reduction from a 45° landing flap configuration to 25°. This immediate flap reduction is not that desired to initiate the rundown, but rather the first flap reduction after the aircraft begins to climb. Thus logic circuitry 29 includes the flap position input 10 as being applied to a detector circuitry 51. detector circuitry 51 produces a logic 1 output when the flaps are reduced to 22 degrees (a value less than that immediately initiated in a prescribed go-around maneuver for a particular aircraft). The ouput 52 from the 22° flap angle detector 41 is applied as first input to AND gate 53. A second input 40 to AND gate 53 comprises a logic 1 input when in go-around mode. Thus a logic 1 output from AND gate 53 is applied to output OR gate 54 to provide an output 412 at logic 1 voltage level which operates the FLSCH switch of FIG. 1 to the logic 1 position and initiates the command angle-of-attack rundown for go-around mode.

As discussed above, during takeoff mode, the rundown of angle-of-attack command is initiated in response to the first flap change from the take-off flap position. Because flap deployments for takeoff may vary over a considerable range, the takeoff flap position is first memorized and the memorized takeoff position compared with the flap position input signal to initiate the rundown. Flap position input 10 ($\delta_F$) is applied to a synchronizer loop comprised of mixer 42, strut switch 44, and integrator 46. Strut switch 44, when the aircraft is on the ground, closes the synchronizer and applies the output of mixer 42 as an input 45 to integrator 46. Output 47 from integrator 46 is applied as a second (subtractive) input to signal combining means 42 and the output 47 from integrator 46 synchronizes to the flap position input 10 and becomes a memorized value of flap position existing when the aircraft becomes airborne. The memorized takeoff flap position 47 and the flap position input signal 10 are applied to a takeoff flap change detector 48, which functions to produce a logic 1 output when the flaps are retracted so as to be less than the memorized takeoff flap position. The output 49 from flap change detector 48 is applied as a first input to a further AND gate 50. The second input 39 to AND gate 50 comrpises a logic 1 input when in takeoff mode. AND gate 50 thus produces a logic 1 output upon the first flap change after takeoff when in the takeoff mode to provide a logic 1 position command to FLSCH switch 22 of FIG. 1.

The present invention is thus seen to provide the formulation of an angle-of-attack error signal corresponding to the discrepancy between a programmed angle of attack reference and the measured angle of attack. The angle-of-attack reference is varied to be consistent with operational speeds, flap retraction schedules, and aircraft performance. As described, the particular angle-of-attack profile is similarly commanded for both takeoff and go-around modes and provides for an initial decrease in angle of attack over a predetermined period of time to allow speed buildup sufficient to permit the first flap change in the flap change schedule during climb out, followed by a smooth rundown in angle of attack permitting constant acceleration to a terminal angle of attack with a predetermined stall margin for a clean wing ($\delta_F = 0°$).

The angle of attack command in accordance with the profile is compared with measured angle of attack to develop an error signal in response to which the pilot (or autopilot) may make good the desired takeoff and go-around profiles. Angle of attack reduction for speed buildup may be initiated at the attainment of a desired predetermined altitude and provides an improved noise abatement profile.

As illustrated in FIG. 1, the system permits a flexibility in choosing different climb rates for takeoff and go-around modes. For example, the entire profile, as defined by the $\alpha_R$ output 13 from the profile generating circuitry 12, may be shifted upward by the further inclusion of a positive bias source 7 corresponding to a predetermined angle of attack decrease (for example 1.2°) through a switching means 8 responsive to go-around mode as a further additive input 9 to signal combining means 14. This additional bias would affect the initial climb speed when in go-around mode, where the criterion is to gain altitude as fast as possible with maintenance of engine-out capability and prescribed stall margin.

It is to be understood that the particular bias levels, the stall safety margins, the fading rates and the terminal angle of attack as referenced herein are by way of specific example only and not by way of limitation.

Although the present invention has been described with respect to a particular embodiment thereof, it is not to be so limited, as changes might be made therein which fall within the scope of the invention as defined in the appended claims.

I claim:

1. In an angle of attack referenced aircraft pitch command signal generation system, means for generating an angle-of-attack command signal defined by a predetermined profile for each of takeoff and go-around computation command mode capabilities comprising, first means responsive to measured aircraft flap position to generate a reference angle-of-attack signal corresponding to a predetermined speed margin over the stall speed corresponding to that flap position for a particular aircraft, signal synchronizing means receiving said reference angle-of-attack signal and developing an output angle-of-attack command signal corresponding to said reference angle-of-attack, altitude responsive means for decreasing said reference angle-of-attack by a predetermined angular decrease over a predetermined period of time initiated at the attainment of a predetermined aircraft altitude, reference angle-of-attack signal processing means, the output of said signal processing means comprising said angle-of-attack command signal, said signal processing means comprising means responsive to said takeoff mode and to predetermined flap deployment to reduce said angle-of-attack command signal to a predetermined reference level over a predetermined period of time initiated at the first reduction in flap deployment from that flap deployment existing at aircraft lift-off, said signal processing means being additionally responsive to said go-around mode and to predetermined flap deployment to reduce said angle-of-attack command signal to said predetermined reference level over said predetermined period of time in response to flap deployment angles less than a predetermined angular deployment.

2. A command signal generation system as defined in claim 1 further including means for increasing said reference angle of attack signal by a predetermined angular increase in response to said go-around mode being effected.

3. A command signal generation means as defined in claim 1 wherein said altitude responsive means comprises a first signal combining means to which said reference angle-of-attack signal is applied as a first input, a first bias signal source of magnitude corresponding to said first predetermined angular decrease, altitude responsive switching means through which said first bias signal source is applied as a subtractive second input to said first signal combining means for altitudes equal to and greater than said predetermined altitude, the output of said first signal combining means comprising said reference angle-of-attack input signal to said signal synchronizing means.

4. Command signal generation means as defined in claim 3 wherein said signal synchronizing means comprises a signal integrator, a second signal combining means receiving said reference angle of attack signal as a first input thereto, a second switching means, the output of said second signal combining means being selectively connected as input to said signal integrator through a first position of said second switching means, the output of said signal integrator being applied as a subtractive second input to said second signal combining means, the output of said signal integrator comprising said angle-of-attack command signal; said signal processing means comprising a further angle-of-attack bias source corresponding to said predetermined angle-of-attack command signal reference level, means for subtractively combining said further bias source with said angle of attack command signal, means responsive to an output signal in excess of zero from said means for subtractively combining to generate a substantially constant reference signal of predetermined mangitude, and means for selectively applying said reference signal as input to said signal integrating means in lieu of said reference angle-of-attack signal through a second position of said second switching means.

5. Command signal generation means as defined in claim 4 wherein said means for subtractively combining comprises a third signal combining means receiving said further bias source and said angle-of-attack command signal as respective mutually subtractive inputs thereto, said means for generating said reference signal comprising signal amplifying means receiving the output of said third signal combining means, signal limiting means receiving the output of said amplifying means, and the output of said signal limiting means comprising said reference signal.

6. Command signal generation means as defined in claim 4 wherein said first and second positions of said second switching means are effected by flap schedule logic means; said flap schedule logic means comprising means to position said second switching means from the first position thereof to the second position thereof during takeoff mode at the time corresponding to said first flap reduction from the flap angle deployment existing a the instant of aircraft takeoff, said logic means further comprising means to position said second switching means from the first position thereof to the second position thereof during go-around mode at the time corresponding to falp reduction to said predetermined angular deployment angle.

7. Command signal generation means as defined in claim 6 wherein said logic means comprises means to generate an outut signal logic level to effect said second switching means second position in response to said predetermined flap deployment angle and go-around mode being simultaneously effected, and means to further generate an output signal logic level to effect said further switching means second position in response to said first flap angle deployment being less than that angle existing at aircraft takeoff.

8. Command signal generation means as defined in claim 7 wherein said means to further generate comprises strut switch responsive means to memorize the flap angle deployment existing at aircraft lift-off, an means for comparing said memorized flap angle with the instantly existing flap angle and generating said output signal logic level upon said existing flap angle being less than said takeoff flap angle.

9. Command signal generation means as defined in claim 8 wherein said memorizing means comprises a further signal synchronizer responsive to said strut switch to produce an output signal corresponding to flap angle deployment at takeoff, said means for comparing comprising a signal comparator receiving the output signal from said further signal synchronizer and a signal proportional to existing aircraft flap deployment and producing said output signal logic level upon said existing flap angle signal being less than the output signal from said further signal synchronizer.

* * * * *